(12) United States Patent
Mitsui

(10) Patent No.: US 7,371,898 B2
(45) Date of Patent: May 13, 2008

(54) METHODS FOR PRODUCING CARBONYL FLUORIDE AND APPARATUS FOR PRODUCTION

(75) Inventor: Yuki Mitsui, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 27 days.

(21) Appl. No.: 11/449,831

(22) Filed: Jun. 9, 2006

(65) Prior Publication Data

US 2006/0229467 A1 Oct. 12, 2006

Related U.S. Application Data

(63) Continuation of application No. PCT/JP2004/018504, filed on Dec. 10, 2004.

(30) Foreign Application Priority Data

Dec. 11, 2003 (JP) .............................. 2003-413238

(51) Int. Cl.
*C07C 51/58* (2006.01)

(52) U.S. Cl. ...................................... 562/848; 562/852
(58) Field of Classification Search .................... None
See application file for complete search history.

(56) References Cited

FOREIGN PATENT DOCUMENTS

| JP | 2003-221214 | 8/2003 |
|----|-------------|--------|
| JP | 2003-267712 | 9/2003 |

OTHER PUBLICATIONS

Handbook of Preparative Inorganic Chemistry I, p. 206, 2$^{nd}$ Ed., Georg Brauer, Ed. Academic Press, New York 1965.

*Primary Examiner*—Paul A. Zucker
(74) *Attorney, Agent, or Firm*—Oblon, Spivak, McClelland, Maier & Neustadt, P.C.

(57) ABSTRACT

A method for producing carbonyl fluoride by continuously supplying carbon monoxide and fluorine into a reaction chamber together with a diluent gas and letting them react with each other, where hydrogen fluoride or carbonyl fluoride is used as the diluent gas.

10 Claims, 2 Drawing Sheets

METHODS FOR PRODUCING CARBONYL FLUORIDE AND APPARATUS FOR PRODUCTION

TECHNICAL FIELD

The present invention relates to an industrially advantageous method for producing carbonyl fluoride ($COF_2$) useful as cleaning gas or etching gas for e.g. an apparatus for producing semiconductors or as a fluorinating agent for organic compounds.

BACKGROUND ART

As a synthesis method for carbonyl fluoride, a method of directly fluorinating carbon monoxide with fluorine by a flow method, is known (Non-Patent Document 1). However, to carry out this reaction, there has been a danger of explosion or a decrease in the reaction yield of carbonyl fluoride due to a side reaction, and it has been necessary to add an inert gas such as $N_2$, He, Ne or Ar to the reaction system in order to avoid vigorous heat generation (Patent Document 1).

In such a method of diluting carbon monoxide and fluorine as the stating material gases with an inert gas, it is preferred to carry out the dilution so that the concentration of $COF_2$ will be at most 50% at the outlet of the reactor. After the reaction by this method, obtained $COF_2$ is required to be purified, and as such a purification method, distillation purification or a method of cooling it to a temperature lower than the melting point (−111° C.) of $COF_2$ for solidification, followed by collection, is conceivable.

However, the method of solidifying $COF_2$, followed by collection, is not suitable as an industrial production process from the viewpoint of costs for the extremely low temperature cooling medium such as liquid nitrogen or from the viewpoint of a decrease in the overall heat transfer coefficient with the cooling surface along the progress in the solidification and collection of $COF_2$ in the solidification/collection apparatus. On the other hand, in the method by distillation purification, $COF_2$ (boiling point under atmosphere pressure: −85° C.) is liquefied by condensation to separate the above inert gas having a boiling point lower than $COF_2$, but there is a problem such that $COF_2$ under vapor pressure at the condensation temperature (e.g. from −70° C. to 20° C.) will be lost as accompanied with the above inert gas, whereby the yield of $COF_2$ will be low.

Patent Document 1: JP-A-2003-267712
Non-Patent Document 1: Handbook of preparative inorganic chemistry I, p. 206, 2nd ed., Georg Brauer, ed., Academic Press, New York, 1965

DISCLOSURE OF THE INVENTION

Object to be Accomplished by the Invention

It is an object of the present invention to provide a method whereby $COF_2$ can be produced in good yield industrially without the above-mentioned problems.

Means to Accomplish the Object

The present invention provides a method for producing carbonyl fluoride, which comprises continuously supplying carbon monoxide and fluorine into a reaction chamber together with a diluent gas and letting them react with each other and which is characterized in that hydrogen fluoride or carbonyl fluoride is used as the diluent gas.

Further, the present invention provides an apparatus for producing carbonyl fluoride wherein carbon monoxide and fluorine are reacted to form carbonyl fluoride, which is characterized by comprising a means to supply carbon monoxide, a means to supply fluorine, a means to supply a diluent gas being hydrogen fluoride or carbonyl fluoride and a reaction chamber.

Effects of the Invention

In the present invention, when hydrogen fluoride is used as the diluent gas, hydrogen fluoride and $COF_2$ can easily be separated by gas-liquid separation by cooling the obtained reaction product, since the boiling point of hydrogen fluoride (19.5° C. under atmosphere pressure) is higher than the boiling point of $COF_2$ (−85° C. under atmosphere pressure).

Further, in the present invention, when a diluent gas containing $COF_2$ mainly, is used, the loss of $COF_2$ under vapour pressure at the time of distillation purification can be avoided.

Namely, according to the present invention, recovery of $COF_2$ from the reaction product after completion of the reaction is easy, and $COF_2$ of high purity can be produced in good yield on an industrial scale.

MEANINGS OF SYMBOLS

Figure 1:
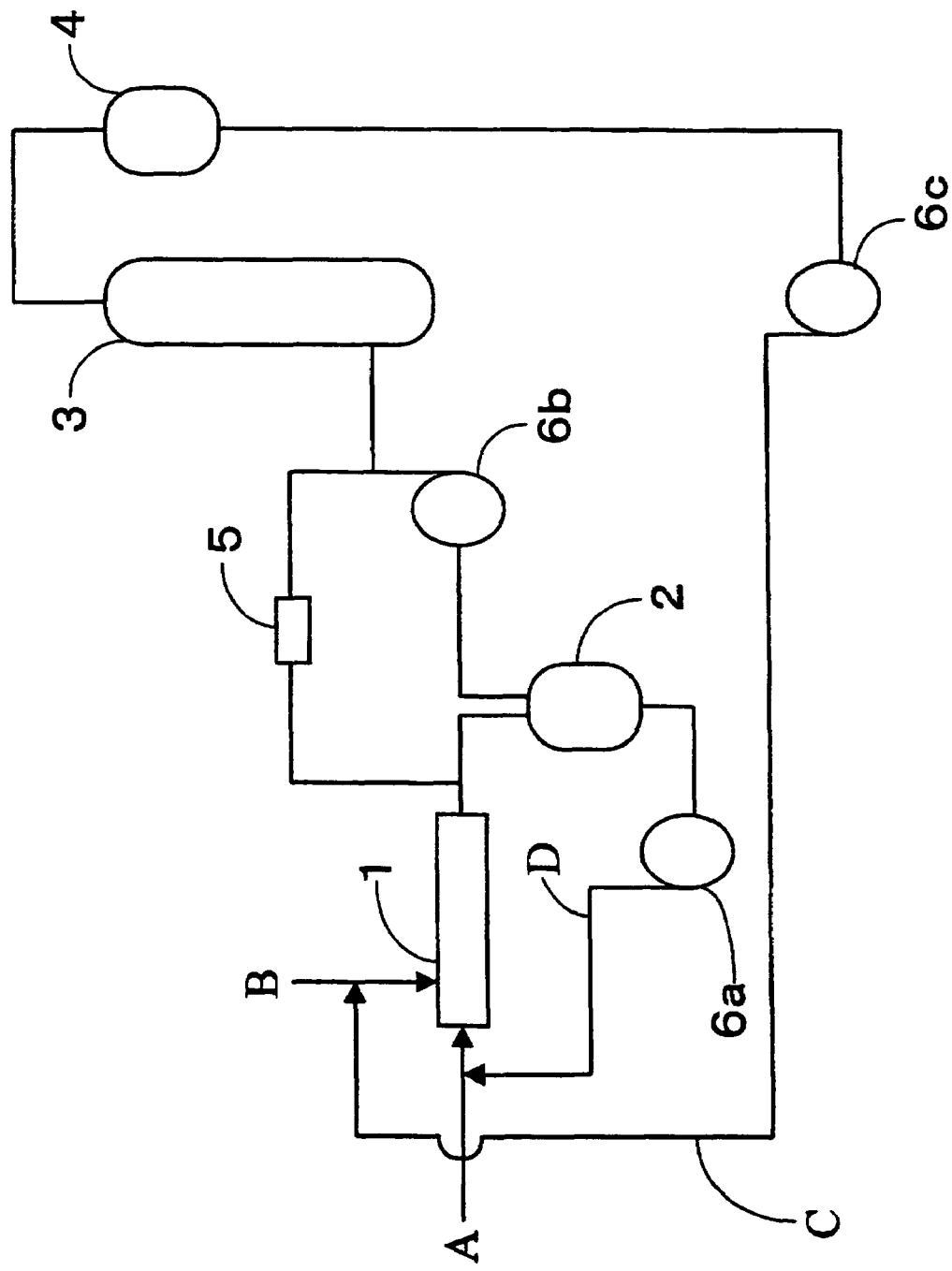
FIG. 1 is a flow chart showing an embodiment of the production method of the present invention.

1: Reaction chamber
2: Cold trap
3: $COF_2$ refinery
4: $COF_2$ storage tank
5: Pressure-regulating value
6a, 6b, 6c: Pumps
7: Reactor
8: Cooling jacket
A: First raw material gas
B: Second raw material gas
C: Diluent gas
D: $COF_2$
E: Reaction product
F: Cooling medium

BEST MODE FOR CARRYING OUT THE INVENTION

In the present invention, hydrogen fluoride or carbonyl fluoride is used as the diluent gas. Hydrogen fluoride is preferred in that it is a substance not fluorinated by fluorine having high reactivity, its boiling point is close to normal temperature, it is readily separable since the difference in the boiling point from $COF_2$ is large, and it is readily available at low cost. Further, $COF_2$ is preferred in that as compared with a case where in an inert gas such as $N_2$, He, Ne or Ar having a low boiling point is used as the diluent gas, there will be no loss of $COF_2$ under vapour pressure at the time of distillation purification.

It is preferred that the ratio of the supply flow rate of the diluent gas is within a range of from 1 to 100, particularly from 1 to 40, by volume ratio to the supply flow rate of whichever is smaller the supply flow rate of the carbon monoxide or the supply flow rate of the fluorine. In a case where the above ratio is within this range, it is possible to avoid high heat generation or a decrease in the reaction yield of carbonyl fluoride due to a side reaction.

The diluent gas is preferably composed solely of hydrogen fluoride, $COF_2$, or a mixture thereof. However, it may contain further inert gases within a range not to impair the effects of the present invention.

Further, in the present invention, when a diluent gas containing hydrogen fluoride is used, it is preferred that hydrogen fluoride is separated and recovered from the obtained reaction product and again supplied as a diluent gas to the reaction chamber.

On the other hand, in the present invention, when a diluent gas containing $COF_2$ is used, it is preferred that the obtained reaction product is purified to obtain $COF_2$, and a part of the obtained $COF_2$ is again supplied as a diluent gas to the reaction chamber.

Here, as the diluent gas containing $COF_2$, the obtained reaction product itself may be employed. However, in such a case, unreacted fluorine is likely to be present in the reaction product, and therefore, the reaction product to be recycled is preferably returned to the supply route of fluorine.

Purification of the above reaction product is preferably carried out by distillation, and $COF_2$ of high purity can be obtained by carrying out the distillation under an elevated pressure of e.g. from 0.2 to 5 MPa (absolute pressure, the same applies hereinafter) under a condition of a temperature of from −20 to 130° C.

FIG. 1 shows a schematic view of a production flow in a case where the diluent gas is recovered and reused as mentioned above. In FIG. 1, either one of the first raw material gas A and the second raw material gas B may be fluorine or carbon monoxide. Further, in FIG. 1, a supply inlet for a diluent gas containing hydrogen fluoride is provided in the supply route for the first raw material gas A, and a supply inlet for a diluent gas containing $COF_2$ is provided in the supply route for the second raw material gas B. However, the locations of the supply inlets for these diluent gases are not limited to the above, and, for example, they may be provided directly on the reaction chamber 1.

However, with a view to suppressing the reactivity of fluorine, it is preferred to provide the supply inlet for the diluent gas on the supply route to supply fluorine.

In the present invention, the temperature of the reaction zone wherein carbon monoxide and fluorine gas are mixed and reacted, is usually preferably from 20 to 500° C. Further, this temperature of the reaction zone is preferably at most heat resistant temperature of the material constituting the reaction chamber, and, for example, in a case where the material is SUS304, such a temperature is preferably at most 500° C.

On the other hand, the exterior wall of the reaction chamber is preferably cooled to a temperature of from 20° C. to 100° C., particularly preferably from 20° C. to 60° C., from the viewpoint of suppression of formation of impurities due to a side reaction, and thermal protection of the reaction chamber.

Further, the pressure for the reaction in the present invention may be reduced pressure or elevated pressure. It is usually in the vicinity of atmospheric pressure of from 0.01 MPa to 0.15 MPa, more preferably from 0.02 MPa to 0.13 MPa.

The ratio of the supply flow rate of carbon monoxide to the supply flow rate of fluorine is preferably such that the supply flow rate of carbon monoxide/the supply flow rate of fluorine is from 1 to 4, particularly preferably from 1 to 1.1, by molar ratio. If the above ratio exceeds the above range, i.e. if carbon monoxide is added excessively, the excessive carbon monoxide is required to be separated in the subsequent step of purifying the reaction product, which may cause a decrease in the yield of $COF_2$.

In the present invention, in a case where as the diluent gas, a diluent gas containing hydrogen fluoride is used, it is preferred that the reaction product withdrawn from the reaction chamber, is cooled to a temperature lower than the boiling point of hydrogen fluoride by e.g. a cold trap, so that hydrogen fluoride is liquefied, and the hydrogen fluoride and $COF_2$ can be separated by gas-liquid separation. Here, the cooling temperature for the gas-liquid separation is preferably from −70 to 10° C.

The method for producing carbonyl fluoride according to the present invention can be carried out by means of an apparatus for producing carbonyl fluoride, which comprises a means to supply carbon monoxide, a means to supply fluorine, a means to supply a diluent gas being hydrogen fluoride or carbonyl fluoride, and a reaction chamber.

In a case where hydrogen fluoride is used as the diluent gas, and hydrogen fluoride is separated and recovered from the obtained reaction product and again supplied as a diluent gas to the reaction chamber, it is preferred to employ the above production apparatus which has a means to recover hydrogen fluoride from the reaction product withdrawn from the reaction chamber and a means to return the recovered hydrogen fluoride to the reaction chamber.

Further, in a case where $COF_2$ is used as the diluent gas, the obtained reaction product is purified to obtain $COF_2$, and a part of the obtained $COF_2$ is again supplied as a diluent gas to the reaction chamber, it is preferred to employ the above production apparatus which has a means to purify the reaction product withdrawn from the reaction chamber to obtain carbonyl fluoride and a means to return a part of the recovered carbonyl fluoride to the reaction chamber.

Figure 2:
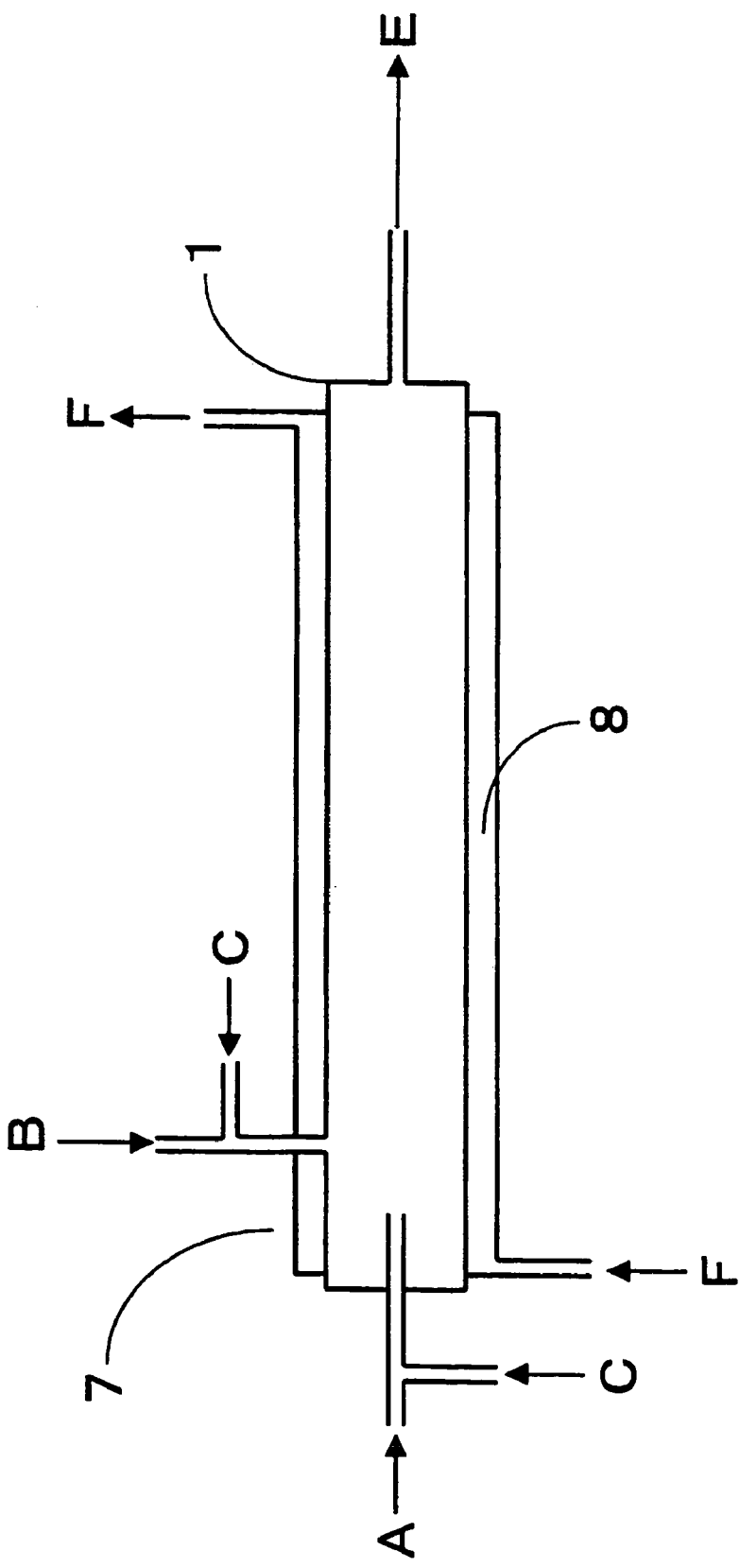
FIG. 2 is a schematic view showing the production apparatus of the present invention.

As an embodiment of the apparatus for producing carbonyl fluoride of the present invention, an apparatus shown in FIG. 2 may, for example, be used. This reaction apparatus has a double pipe structure, and a cooling medium F is permitted to flow between an outer cylinder and an inner cylinder 1 constituting the reaction chamber. To the inner cylinder for carrying out the reaction, carbon monoxide as the first raw material gas A and fluorine as the second raw material gas B will be supplied. The apparatus shown in FIG. 2 illustrates a case where the diluent gas C is supplied to each of the carbon monoxide supply route and the fluorine supply route. Carbon monoxide and hydrogen fluoride will be mixed while flowing in the inner cylinder 1, and reacted to form carbonyl fluoride.

EXAMPLES

Now, the present invention will be described in detail with reference to Examples. Example 1 represents a Comparative Example, and Example 2 represents an Example of the present invention.

Example 1

A reaction apparatus as shown in FIG. 2 is prepared. The inner cylinder is made of SUS304, and its diameter is 25 mm. Further, a piping having an inner diameter of 12.5 mm was used as the supply route of the first raw material gas and as the supply route of the second raw material gas. From the supply route of the first raw material gas, fluorine is supplied to the inner cylinder at a supply rate of 1,000 cm$^3$/min (standard state), and from the supply route of the second raw material gas, a mixed gas of nitrogen 4,000 cm$^3$/min (standard state) and carbon monoxide 1,000 cm$^3$/min (standard state) is supplied to the inner cylinder 1. At that time the reaction pressure in the inner cylinder is 0.12 MPa, and the reaction temperature is adjusted to be at most 500° C. A reaction product E recovered from the reaction gas outlet is distilled under a pressure of from 0.2 to 5 MPa to isolate $COF_2$. The yield of the obtained $COF_2$ is about 80%.

Example 2

Using the same reaction apparatus as in Example 1, the reaction was carried out in the same manner as in Example 1 except that instead of nitrogen, $COF_2$ 4,000 cm$^3$/min (standard state) was supplied as the diluent gas C. The purity of the reaction product E recovered from the reaction gas outlet was analyzed by gas chromatograph, whereby the purity of $COF_2$ was 99%, and the yield was 90%.

INDUSTRIAL APPLICABILITY

The production method of the present invention can be applied to an industrial method for producing carbonyl fluoride ($COF_2$) which is useful as cleaning gas or etching gas for e.g. an apparatus for producing semiconductors or as an agent for fluorinating organic compounds.

The entire disclosure of Japanese Patent Application No. 2003-413238 filed on Dec. 11, 2003 including specification, claims, drawings and summary is incorporated herein by reference in its entirety.

What is claimed is:

1. A method for producing carbonyl fluoride, which comprises continuously supplying carbon monoxide and fluorine into a reaction chamber together with a diluent gas and letting them react, wherein hydrogen fluoride or carbonyl fluoride is the diluent gas.

2. The method for producing carbonyl fluoride according to claim 1, wherein the ratio of the supply flow rate of the diluent gas is within a range of from 1 to 100 by volume ratio to the supply flow rate of the smaller of the supply flow rate of the carbon monoxide and the supply flow rate of the fluorine.

3. The method for producing carbonyl fluoride according to claim 1, wherein after carrying out the reaction by supplying hydrogen fluoride as the diluent gas, hydrogen fluoride is recovered from the reaction product thereby obtained, and the recovered hydrogen fluoride is recycled as the diluent gas for the reaction.

4. The method for producing carbonyl fluoride according to claim 1, wherein the obtained reaction product is purified to obtain carbonyl fluoride, and a part of the obtained carbonyl fluoride is used as the diluent gas for the reaction.

5. The method for producing carbonyl fluoride according to claim 1, wherein hydrogen fluoride is the diluent gas.

6. The method for producing carbonyl fluoride according to claim 1, wherein carbonyl fluoride is the diluent gas.

7. The method for producing carbonyl fluoride according to claim 1, wherein carbon monoxide and fluorine are reacted to form carbonyl fluoride in an apparatus comprising a carbon monoxide supply, a fluorine supply, a diluent gas supply, and said reaction chamber.

8. The method for producing carbonyl fluoride according to claim 5, wherein carbon monoxide and fluorine are reacted to form carbonyl fluoride in an apparatus comprising a carbon monoxide supply, a fluorine supply, a diluent gas supply, said reaction chamber, means to recover hydrogen fluoride from the reaction product withdrawn from the reaction chamber and a means to return the recovered hydrogen fluoride to the reaction chamber.

9. The method for producing carbonyl fluoride according to claim 6, wherein carbon monoxide and fluorine are reacted to form carbonyl fluoride in an apparatus comprising a carbon monoxide supply, a fluorine supply, a diluent gas supply, said reaction chamber, means to purify the reaction product withdrawn from the reaction chamber to obtain carbonyl fluoride, and means to return a part of the recovered carbonyl fluoride to the reaction chamber.

10. The method for producing carbonyl fluoride according to claim 7, wherein the temperature of the reaction chamber where carbon monoxide and fluorine gas are reacted is from 20 to 500° C. and the pressure for the reaction is from 0.01 MPa to 0.15 MPa.

* * * * *